US006693588B1

(12) United States Patent
Schlee

(10) Patent No.: US 6,693,588 B1
(45) Date of Patent: Feb. 17, 2004

(54) METHOD FOR CALIBRATING AN ELECTRONICALLY PHASE-CONTROLLED GROUP ANTENNA IN RADIO COMMUNICATIONS SYSTEMS

(75) Inventor: Johannes Schlee, Blaustein (DE)

(73) Assignee: Siemens Aktiengesellschaft, Munich (DE)

( * ) Notice: Subject to any disclaimer, the term of this patent is extended or adjusted under 35 U.S.C. 154(b) by 91 days.

(21) Appl. No.: 10/111,503

(22) PCT Filed: Oct. 24, 2000

(86) PCT No.: PCT/DE00/03756

§ 371 (c)(1), (2), (4) Date: Apr. 24, 2002

(87) PCT Pub. No.: WO01/31744

PCT Pub. Date: May 3, 2001

(30) Foreign Application Priority Data

Oct. 26, 1999 (DE) ........................................ 199 51 525

(51) Int. Cl.[7] ............................. H01Q 3/00; G01S 7/40

(52) U.S. Cl. ........................ 342/368; 342/165; 342/174

(58) Field of Search ................................ 342/165, 174, 342/368, 375, 372, 377, 455

(56) References Cited

U.S. PATENT DOCUMENTS

| | | | | |
|---|---|---|---|---|
| 5,955,989 A | * | 9/1999 | Li | 342/368 |
| 6,127,966 A | * | 10/2000 | Erhage | 342/174 |
| 6,236,839 B1 | * | 5/2001 | Gu et al. | 455/67.14 |

FOREIGN PATENT DOCUMENTS

| | | | | |
|---|---|---|---|---|
| GB | 2171849 A | * | 9/1986 | H01Q/3/26 |

OTHER PUBLICATIONS

Johannisson et al, "Antenna Array Calibration", PCT/SE95/00627, Dec. 14, 1995.*

Miya et al, "Calibration Device For Array Antenna Wireless Reveiver", PCT/JP98/01129, Sep. 24, 1998.*

* cited by examiner

*Primary Examiner*—Thomas H. Tarcza
*Assistant Examiner*—Isam Alsomiri
(74) *Attorney, Agent, or Firm*—Staas & Halsey LLP

(57) ABSTRACT

An electronically phase-controlled group antenna is calibrated in radio communications systems, using a reference point shared by all the reference signals. In the downlink, reference signals which can be distinguished from one another are simultaneously transmitted by individual antenna elements of the group antenna and are suitably separated after reception at the shared reference point.

21 Claims, 2 Drawing Sheets

METHOD FOR CALIBRATING AN ELECTRONICALLY PHASE-CONTROLLED GROUP ANTENNA IN RADIO COMMUNICATIONS SYSTEMS

CROSS REFERENCE TO RELATED APPLICATIONS

This application is based on and hereby claims priority to PCT application Ser. No. PCT/DE00/03756 filed on Oct. 24, 2000 and German Application No. 199 51 525.5 filed Oct. 25, 1999, the contents of which are hereby incorporated by reference.

BACKGROUND OF THE INVENTION

The invention relates a method for calibrating an electronically phase-controlled group antenna, using a reference point shared by all the reference signals, in radio communications systems and to an arrangement for this.

By the use of electronically phase-controlled group antennas, known as intelligent antennas, in radio communications systems, such as for example digital mobile radio systems, a directional selectivity of a mobile radio channel that exists in spite of multipath propagation can be advantageously used for the radio communication.

Intelligent antennas form a radiation pattern by corresponding phase-directed activation of the individual antenna elements of the antenna array. The beam forming can therefore be used to transmit a message from a base station to a subscriber station specifically in the direction of the latter. As a result, on the one hand the sensitivity to interferences in the particular radio cell of the base station can be reduced and on the other hand co-channel interferences in neighboring radio cells can be reduced. Moreover, the range of a base station which is providing a specific mobile station with radio resources increases significantly for the same transmit power. In addition, as a consequence of the spatial separation, physical channels within a radio cell served by a base station can be reused and the antenna lobes, as they are known, of the directional diagram can be adaptively corrected when subscriber stations move.

To achieve a desired beam formation, the original transmission signal is sent via a plurality of antenna elements, usually with different, but defined phase angles. The corresponding phase angle is ascertained for each antenna element by a digital signal processing (DSP).

Unforeseeable phase errors and time delays generally occur when setting the phase angle in the analog area between digital/analog converters and antenna elements. As a result, the transmission signals are not sent with the desired phase angles and the beam formation is falsified or even impossible. To counteract this unfavorable property of the analog area of beam formation, what is known as antenna calibration is necessary. Antenna calibration eliminates the influence of the entire analog signal chain on the errors described above.

To use beam formation, firstly the direction of the base station in relation to the mobile station must be established. The direction is established by evaluation of the various phase angles of the received signal at each antenna element of the antenna array. Therefore, an antenna calibration in the base station is necessary not only for the downlink to the subscriber station but also for the uplink from the subscriber station to the base station.

In a TD-SCDMA system (Time Division-Synchronous Code Division Multiple Access System), using intelligent antennas, an additional antenna, known as a reference antenna, is used for the antenna calibration. For the case of an uplink calibration, a reference signal is sent via the reference antenna to all the antenna elements of the antenna array. At the individual antenna elements, a specific delay time and a specific phase position, depending on the distance from the reference antenna, are expected on account of the finite propagation velocity of electromagnetic waves. The difference between the expected setpoint value and the actually measured actual value is ascertained and stored as a correction factor. The correction factor is then included in the normal signal processing process, whereby the antenna is calibrated.

For the downlink calibration, the reference antenna receives at a specific point in time a reference signal from an antenna element of the antenna array, and the correction factor is determined. To counteract the distortion of the measurement results on account of different antenna elements of the antenna array, they must not transmit a signal at this point in time. Subsequently, at a second point in time, the reference antenna receives a reference signal from a second antenna element of the antenna array, and the correction factor for this second antenna element is determined, and so on. For the calibration of n antenna elements of the antenna array, accordingly n time slots must be used when supporting a TDMA subscriber separation method (Time Division Multiple Access).

The error in the delay time is often only a fraction of a chip (chip=CDMA code element). To take such a small delay time into account in the signal processing, an oversampling of the received signal and transmission signal is necessary. However, oversampling makes the data rates to be transmitted considerably greater.

SUMMARY OF THE INVENTION

The invention is based on the object of significantly shortening the time for the calibration of intelligent antennas in the downlink.

A further object is to perform a correction of the analog error without the necessity of calculating a correction factor for each antenna element and without oversampling and the associated higher data rates.

A further object is to keep down the load on the transmission capacity of physical channels caused by an antenna calibration.

According to one aspect of the invention, all the antenna elements of an intelligent antenna in the downlink are calibrated in only one step. For this purpose, reference signals which can be distinguished from one another are simultaneously sent by the individual antenna elements of the antenna array and are separated again after reception at a reference point shared by all the reference signals.

An advantageous refinement provides a separation of the reference signals using a CDMA method (CDMA=Code Division Multiple Access), which is based on a separation of signals by individual spread-spectrum codes.

In a further refinement, conventional spread-spectrum code techniques, such as correlation, in which the common reference point is synchronized to the respective reference code channel of the antenna elements and the reference signals are again reduced to their original bandwidth, are used for the separation of the reference signals.

According to a further refinement, in this case the reference signals are orthogonally coded, in order that the interferences remain minimal in spite of simultaneous transmission.

The calibration factor can be obtained from the result of the correlation in a digital signal processor.

Another advantageous form of the invention is to use an optimized amount of reference signals, which allows an impartial estimate of the calibration factor.

The generation of such an optimized amount of reference signals and of the estimated value can be performed in an advantageous way by methods which are described in: Bernd Steiner, Paul Walter Baier: "Low Cost channel Estimation in the uplink receiver of CDMA mobile radio systems", Frequenz 47 (1983), pages 292–298.

According to a further form, the correction of the delay time, phase error and/or amplitude of the transmission signals can be performed directly within a digital UP-conversion/down-conversion, whereby no correction factor has to be included and no oversampling of the received signal and transmission signal is necessary to eliminate delay errors.

For this purpose, tuning of the numerically controled oscillator (NCO) of the digital UP-converter (DUC) and of the digital down-converter (DDC) takes place.

In a further development, in a TDD system the calibration is carried out in the delay time without transmission between the uplink and downlink time slots.

In a further refinement, the downlink calibration may take place at the beginning of the delay time and the uplink calibration may take place at the end of the delay time.

In a further refinement, a reference antenna is used as the shared reference point for the reference signals from and to the antenna elements.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
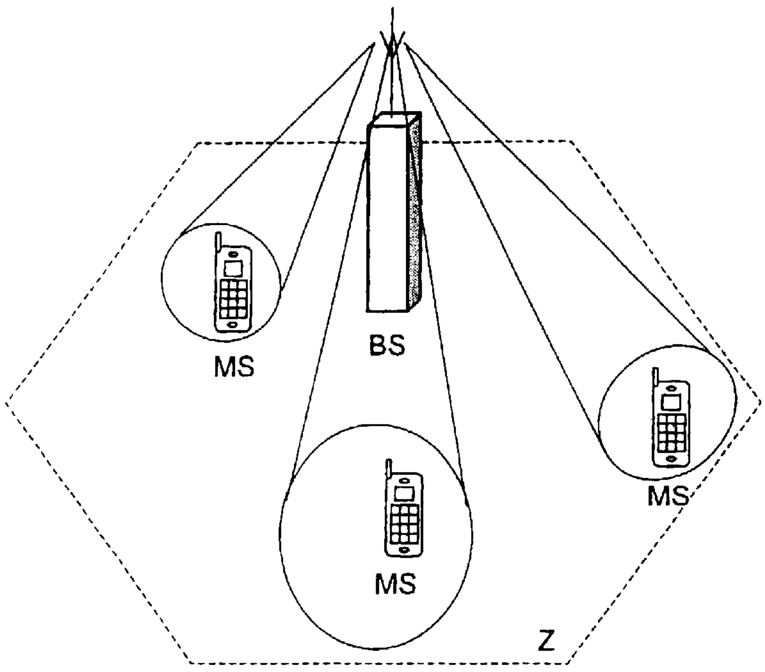
Fig. 1 (Prior art)
FIG. 1 schematically shows a radio communications system using intelligent antennas, FIG. 2 schematically shows the signal flow in an uplink synchronization of an intelligent antenna to be calibrated, FIG. 3 schematically shows the signal flow in a downlink synchronization of an intelligent antenna to be calibrated, and FIG. 4 schematically shows the signaling for an antenna calibration in a delay interval between the uplink and downlink in the TTD mode.

Reference will now be made in detail to the preferred embodiments of the present invention, examples of which are illustrated in the accompanying drawings, wherein like reference numerals refer to like elements throughout.

FIG. 1 shows a base station BS, which has, by way of example, established communication in the area of its served radio cell Z with three mobile stations MS. For an undisturbed connection from and to the mobile stations MS, a channel separation by a time division duplex method TDD is provided. For the separation of the connections between the individual mobile stations MS, the hybrid multiple access method TD-SCDMA (Time Division-Synchron Code Division Multiple Access), a form of TD-CDMA (Time Division-Code Division Multiple Access) may be used by way of example. TD-CDMA is a combination of the multiple access components TDMA (Time Division Multiple Access) and CDMA (Code Division Multiple Access) and is characterized by the degrees of freedom frequency, time slot and code. TD-SCDMA differs from TD-CDMA by the use of a highly accurate synchronization of the received signals in the uplink. As a result, the orthogonality of the received signals is retained to the greatest extent, resulting in turn in an improvement in the detection properties.

A precondition for a TD-SCDMA system or a comparable radio communications system with intelligent antennas is to have antennas with which a directional selectivity of the transmission signals transmitted from a base station BS can be achieved. With intelligent antennas, electronically steerable, highly focusing propagation diagrams can be produced. Consequently, intelligent antennas reduce the angles of incidence for detours caused by the surroundings in the path of the transmission signals to the mobile stations, whereby the interference is reduced. From the same base station BS, it is consequently possible for different antenna lobes, which are steered in different directions, to use simultaneously the same frequency channel within a cell Z. What is more, the range of a base station BS increases for the same transmit power.

In FIG. 1, the intelligent antenna of the base station BS detects the directions from which the mobile stations MS are sending and forms corresponding antenna lobes in their direction.

Figure 2:
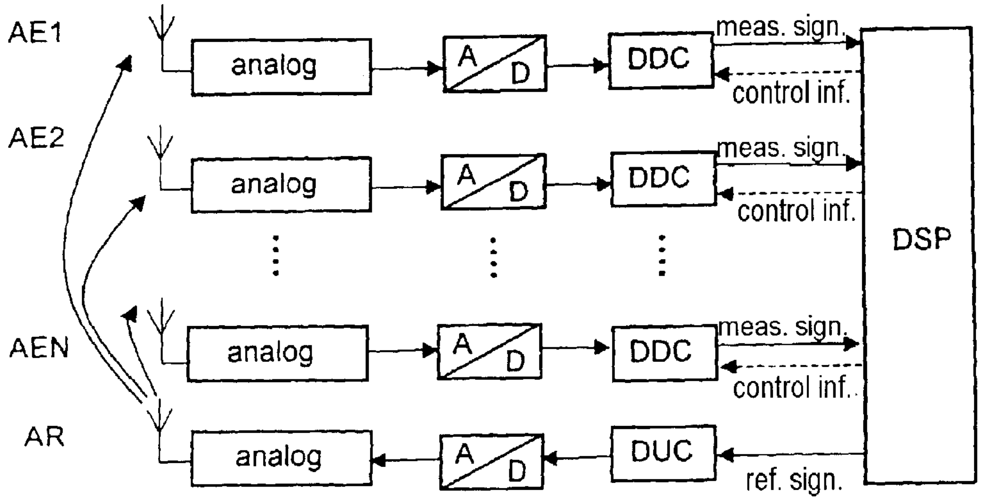

Schematically represented in FIG. 2 is the signal flow in the case of an uplink calibration of an intelligent group antenna, comprising a plurality of antenna elements AE1 to AEN and a reference antenna AR for the calibration. The arrows illustrate the different transit time of a reference signals from a reference antenna AR to the antenna elements AE1 to AEN. The reference signals picked up by each antenna element AE1 to AEN, and amplified if need be, are digitized parallel to one another in analog/digital converters A/D. The digitized values are subsequently handled in parallel in a digital down-converter DDC. From the measuring signals obtained in this way, it is possible for example to ascertain correction factors in a digital signal processor DSP and return the correction values as control information to the digital down-converter DDC of the individual antenna elements AE1 to AEN. What is more, the reference signals from the signal processor DSP are sent via a digital up-converter DUC and a digital/analog converter D/A to the reference antenna AR, which sends said signals to the antenna elements AE1 to AEN for the purpose of calibration, etc.

Figure 3:
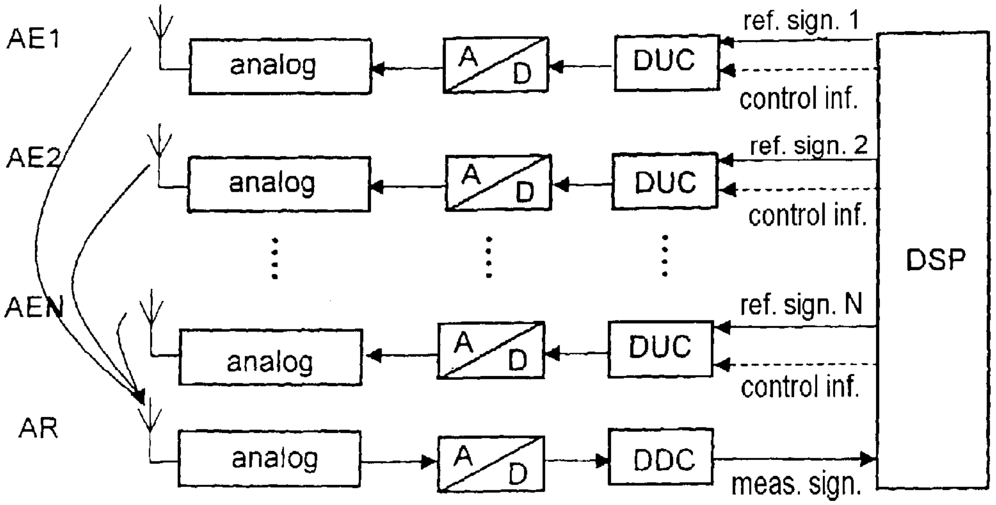

Schematically represented in FIG. 3 is the signal flow in the case of a downlink calibration of an intelligent group antenna. The antenna elements AE1 to AEN each send a reference signal simultaneously to the reference antenna AR, which receives said signals with different reference signal transit times. If need be, the reference antenna AR amplifies the reference signals and converts them back into digital signals in an analog/digital converter A/D. The digitized signals are subsequently handled in a digital down-converter DDC and the measuring signals obtained in this way are fed to the digital signal processor DSP. In the signal processor DSP, correction factors are ascertained, for example, from the measurement results and passed as control information to the digital UP-converters DUC of the antenna elements AE1 to AEN. What is more, reference signals 1 to N are fed to the digital UP-converters DUC for the purpose of transmission by the antenna elements AE1 to AEN.

Selected below is a computational example for a TD-SCDMA system using an intelligent antenna with 8 antenna elements, a reference antenna and a length of the CDMA code elements (chip) of 0.75 μs.

The determination of the calibration factor takes place in a way analogous to channel-estimating methods known from mobile radio technology. The time delay and the phase position of the received reference signals are determined. Since the delay error is very small in comparison with the setpoint delay value, three measurements of channel pulse responses for each antenna element in the time available are adequate for example. Consequently, the signal length for the calibration of all the antenna elements of an intelligent antenna in the downlink is: (8+1) antenna elements*3 measurements*0.75 μs chip length=20.25 μs.

The antenna calibration, that is to say the correction of the influence of the analog error over the entire signal chain on the directional pattern of the intelligent group antenna, is carried out directly digitally. No oversampling of the received signal and transmission signal is necessary to eliminate delay errors.

In modern base stations, digital UP-conversion and down-conversion is used to compensate for problems caused by IQ phase errors and IQ amplitudes offsets. The correction of the delay time and phase of the transmission signals can be achieved directly by tuning the numerically controled oscillator NCO (Numarical Controled Oscillators) of the digital UP-converter (DUC) and of the digital down-converter (DDC), without a correction factor having to be included in the digital signal processing in the DSP.

Digital up-converters DUC and digital down-converters DDC also permit tuning of the amplitude of the transmission signals, since an error-affected amplitude likewise influences the beam formation.

On account of the high data rates between the calibration instance and DUC/DDC, the disadvantage of additionally signaling control information to DUC and DDC is negligible.

Figure 4:
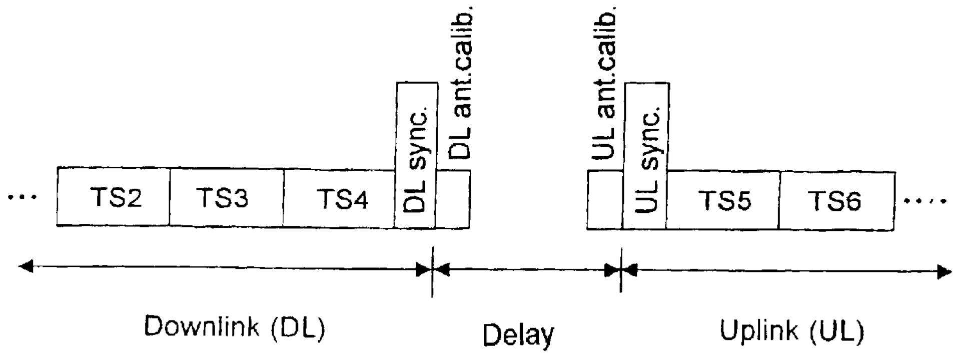

It can be seen from FIG. 4 that, in a TDD system, such as for example TD-SCDMA, a delay time of a certain length is provided between the uplink and downlink for counteracting transit time differences of the signals and data to be transmitted. The calibration measurements preferably take place in this delay time, since at this point in time no further signals can influence the measurements. The downlink calibration is preferably carried out at the beginning of the delay time and the uplink calibration is preferably carried out at the end of this time.

In the same way, a time slot TS provided for communication connections can also be reserved for the calibration procedure described.

The frequency of the antenna calibration is freely selectable and can be adapted dynamically to the transmission requirements. For example, a calibration may be performed in the downlink and uplink in each delay time between downlink and uplink TDMA frames or else a calibration is performed with a time interval which is a multiple thereof. The frequency of a downlink calibration may also differ from the frequency of an uplink calibration, for example if it is established by the base station that a mobile station is moving only insignificantly or not at all during a communication connection, for example for voice transmission, for data transport or for multimedia transmission.

The invention has been described in detail with particular reference to preferred embodiments thereof and examples, but it will be understood that variations and modifications can be effected within the spirit and scope of the invention.

What is claimed is:

1. A method for calibrating an electronically phase-controlled group antenna having n antenna elements in a radio communications system, comprising:

in the case of an antenna calibration in the upward direction, transmitting a reference signal from a shared reference antenna to each of the n antenna elements, the reference signal having a different transit time to the n antenna elements;

in the case of an antenna calibration in the upward direction, passing a measuring signal from each of the n antenna elements to a device for error correction;

in the case of an antenna calibration in the upward direction, ascertaining an error correction value for each of the n antenna elements in relation to a reference point, the error correction values being determined at the device for error correction based on corresponding measuring signals;

in the case of an antenna calibration in the downward direction, transmitting a reference signal from each of the n antenna elements to the reference antenna, such that each antenna element has an assigned reference signal and the n antenna elements form n reference signals at the same time;

in the case of an antenna calibration in the downward direction, receiving the reference signals in superposed form at the reference antenna, each of the reference signals having a different transit time;

in the case of an antenna calibration in the downward direction, passing a shared measuring signal from the reference antenna to the device for error correction, the shared measuring signal carrying information regarding the transit time of each of the reference signals; and in the case of an antenna calibration in the downward direction, ascertaining from the shared measuring signal an error correction value for each of the n antenna elements in relation to the reference point.

2. The method as claimed in claim 1, wherein the reference signals are coded and decoded on the basis of a CDMA method.

3. The method as claimed in claim 2, wherein a correlation method is used for the synchronization of the reference point to a reference code channel of the antenna elements.

4. The method as claimed in claim 3, wherein the reference signals are orthogonally coded.

5. The method as claimed in claim 4, wherein a correction of an analog error in at least one of time delay, phase and amplitude is performed digitally.

6. The method as claimed in claim 5, wherein the correction is performed within a digital up-conversion or a digital down-conversion.

7. The method as claimed in claim 6, wherein a calibration factor to correct the analog error is obtained from a correlation in a digital signal processor.

8. The method as claimed in claim 7, wherein an optimized amount of signals is used to estimate the calibration factor.

9. The method as claimed in claim 8, wherein, in the case of time division duplex operation, the calibration of the electronically phase controlled group antenna is carried out within a delay time between the upward direction and the downward direction.

10. The method as claimed in claim 9, wherein the reference signals for the calibration in the downward direction are sent at the beginning of the delay time.

11. The method as claimed in claim 10, wherein the reference signals for the calibration in the upward direction are sent at the end of the delay time.

12. The method as claimed in claim 8, wherein the reference signals for calibration in at least one of the upward direction and the downward direction are sent in a designated time slot.

13. The method as claimed in claim 1, wherein the reference signals are orthogonally coded.

14. The method as claimed in claim 1, wherein a correction of an analog error in at least one of time delay, phase and amplitude is performed digitally.

15. The method as claimed in claim 14, wherein the correction is performed within a digital up-conversion or a digital down-conversion.

16. The method as claimed in claim 14, wherein a calibration factor to correct the analog error is obtained from a correlation in a digital signal processor.

17. The method as claimed in claim 16, wherein an optimized amount of signals is use to estimate the calibration factor.

18. The method as claimed in claim 1, wherein, in the case of time division duplex operation, the calibration of the electronically phase controlled group antenna is carried out within a delay time between the upward direction and the downward direction.

19. The method as claimed in claim 18, wherein the reference signals for the calibration in the downward direction are sent at the beginning of the delay time.

20. The method as claimed in claim 18, wherein the reference signals for the calibration in the upward direction are sent at the end of the delay time.

21. The method as claimed in claim 1, wherein the reference signals for calibration in at least one of the upward direction and the downward direction are sent in a designated time slot.

* * * * *